(12) United States Patent
Boulet et al.

(10) Patent No.: US 8,726,482 B2
(45) Date of Patent: May 20, 2014

(54) METHOD FOR JOINING TOGETHER AIRCRAFT PARTS

(75) Inventors: Nicolas Boulet, Toulouse (FR); Olivier Chaume, Toulouse (FR)

(73) Assignee: Airbus Operations, Toulouse (FR)

( * ) Notice: Subject to any disclaimer, the term of this patent is extended or adjusted under 35 U.S.C. 154(b) by 153 days.

(21) Appl. No.: 13/222,717

(22) Filed: Aug. 31, 2011

(65) Prior Publication Data

US 2012/0055008 A1 Mar. 8, 2012

(30) Foreign Application Priority Data

Sep. 7, 2010 (FR) ...................................... 10 57110

(51) Int. Cl.
*B23P 19/06* (2006.01)

(52) U.S. Cl.
USPC ........................................ 29/512; 29/525.01

(58) Field of Classification Search
USPC .......... 29/512, 525.01; 411/43, 102, 338, 501
See application file for complete search history.

(56) References Cited

U.S. PATENT DOCUMENTS

| | | | |
|---|---|---|---|
| 2,912,075 A | 11/1959 | Pfistershammer | |
| 3,771,410 A * | 11/1973 | Swindt, II | ...................... 411/338 |
| 7,040,006 B2 * | 5/2006 | Mauer et al. | ..................... 29/716 |
| 2004/0231467 A1 | 11/2004 | Hufnagl et al. | |
| 2006/0251495 A1 * | 11/2006 | Opper | ........................... 411/501 |
| 2008/0206011 A1 | 8/2008 | Wille | |
| 2008/0273938 A1 * | 11/2008 | Rowe et al. | ................... 411/102 |
| 2010/0074710 A1 * | 3/2010 | Auriol et al. | .................... 411/43 |
| 2011/0206480 A1 * | 8/2011 | Escarpit | ....................... 411/511 |

FOREIGN PATENT DOCUMENTS

| | | |
|---|---|---|
| DE | 10 2006 023 320 A1 | 11/2007 |
| DE | 10 2007 040 041 A1 | 2/2009 |
| EP | 1 396 646 A1 | 3/2004 |
| EP | 1 653 091 A1 | 5/2006 |
| EP | 1 961 976 A2 | 8/2008 |
| WO | WO 02/073045 A2 | 9/2002 |
| WO | WO 2005/075841 A1 | 8/2005 |
| WO | WO 2005/124164 A1 | 12/2005 |

OTHER PUBLICATIONS

Preliminary Search Report issued in French Application No. 1057110 dated May 6, 2011 (w/ English Translation).

* cited by examiner

*Primary Examiner* — Alexander P Taousakis
*Assistant Examiner* — Lee Holly
(74) *Attorney, Agent, or Firm* — Oliff PLC

(57) ABSTRACT

In the method of fastening aircraft parts together, the following steps are performed:
 crimping an element onto at least two parts so as to fasten them together; and
 screwing a screw into the element through at least one other part so as to fasten all the parts together and so as to place a head of the screw in a flush position relative to the other part.

7 Claims, 2 Drawing Sheets

METHOD FOR JOINING TOGETHER AIRCRAFT PARTS

The invention relates to fastening aircraft parts together.

BACKGROUND OF THE INVENTION

Certain assemblies on board aircraft comprise at least three parts forming three successive thicknesses that are rigidly fastened to one another by means of one or more fastener members passing through the three thicknesses.

It is sometimes necessary to disassemble such an assembly by removing one of the parts (or more than one if there are more than three parts in all) while leaving the remaining parts fastened together.

Various solutions have been devised for making an assembly that is suitable for being disassembled in that way. Nevertheless, they present at least one of the following drawbacks:

- it is necessary to make at least two holes in two different locations in two of the parts. This requires extra time for assembly;
- the parts need to present orifices of mutually different diameters so it is still necessary to perform two drilling operations. In addition to the time that requires, problems could also arise concerning the alignment of the orifices during assembly;
- the relatively large number of fasteners used increases overall weight; and
- it is necessary to be able to access both opposite sides of the assembly, which means that it is not possible to perform assembly blind.

OBJECT AND SUMMARY OF THE INVENTION

An object of the invention is to assemble together at least three parts while enabling one or more of the parts to be disassembled without requiring the others to be disassembled, which assembly can be performed in reasonable time, without excessively increasing the weight of the assembly, without requiring distinct drilling operations, and finally that enables mounting and dismounting to be performed blind.

To this end, the invention provides a method of fastening aircraft parts together, the method comprising the steps of:

- crimping an element onto at least two parts so as to fasten them together; and
- screwing a screw into the element through at least one other part so as to fasten all the parts together and so as to place a head of the screw in a flush position relative to the other part.

Thus, in order to dismount the part that is held by the screw, it suffices to unscrew the screw. The other parts remain fastened together by the crimping. Receiving the screw in the element means there is no need to make a plurality of orifices in at least one of the parts, thus enabling the method to be performed quickly. For the same reason, the weight of the assembly is not increased. Furthermore, although not essential, the method makes it possible to make the orifices in all of the parts in a single operation, thereby also avoiding potential problems of alignment between them. In addition, the invention enables mounting and dismounting to be performed blind. The flush position of the head of the screw avoids generating portions in relief projecting from the outside face of the stack situated beside the screw.

Advantageously, orifices for receiving the element and the screw are made by means of a single operation for all of the parts.

This avoids any problem of the orifices lying on the same axis.

Preferably, the element is inserted through the or each other part before crimping.

This insertion technique makes blind mounting possible.

Preferably, the element is inserted into the parts before crimping.

Advantageously, the element carrying the screw is inserted into the parts.

This reduces the number of steps required to implement the method.

Preferably, the screw is driven so as to perform the crimping under the effect of the screw-driving.

Thus, all of the parts are assembled together in a single operation. In addition, crimping does not require a specific tool.

The head of the screw may be put into contact with the element.

Thus, some of the stresses transmitted from the screw to the element, and vice versa, are transmitted directly from one to the other without stressing other parts.

The invention also provides a fastener member for aircraft, the member comprising a screw having a head presenting a cavity or a socket, and an element presenting a threaded orifice suitable for engaging the screw and including a thin-walled zone that is continuous in the circumferential direction around the axis of the orifice and of larger inside diameter than the orifice.

This member enables the method of the invention to be implemented. The cavity or socket enables the screw to be driven so as to be placed in the flush position.

Advantageously, the screw includes a head presenting an outside diameter equal to an outside diameter of the element.

This arrangement makes it possible to drill all of the parts in a single operation.

Preferably, the screw is screwed into the element without being tightened, in particular for the purposes of delivering the member, storing it, and handling it prior to mounting on the parts for assembly.

This configuration of the fastener member makes it easier to deliver, store, and handle, in particular on the assembly line where the parts are assembled together. Furthermore, the number of steps that need to be performed while making the assembly is reduced.

Advantageously, the member is arranged in such a manner that driving the screw into the orifice deforms the thin wall.

BRIEF DESCRIPTION OF THE DRAWINGS

Other characteristics and advantages of the invention appear further from the following description of an embodiment given by way of non-limiting example with reference to the accompanying drawings, in which.

MORE DETAILED DESCRIPTION

Figure 1:
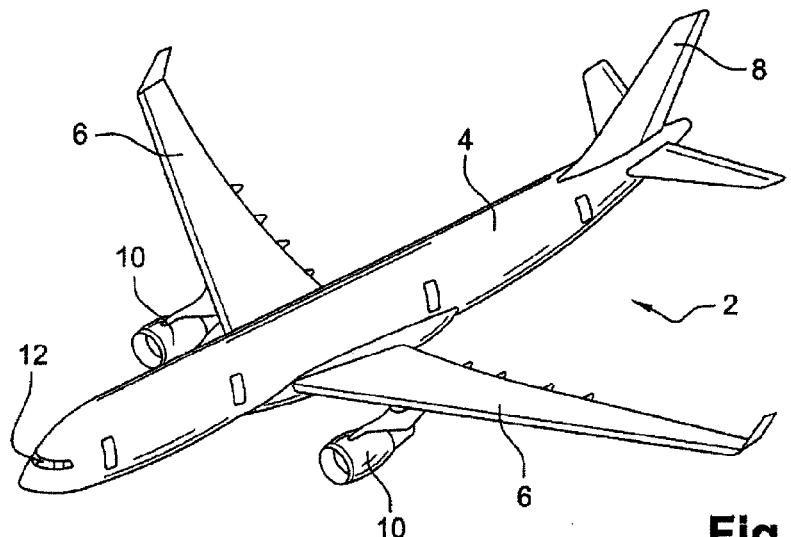
FIG. 1 is a perspective view of an airplane, with the method of the invention being implemented in the manufacture thereof.

FIG. 1 shows an aircraft for which the method of the invention is implemented during manufacture. In the present example, the aircraft is an aerodyne, specifically an airplane 2 comprising a fuselage 4 and two wings 6. It includes a tail 8 and jets 10 fastened to the respective wings. It is an airplane suitable for commercial transport of goods and/or one or more passengers. The airplane is suitable for performing long-haul flights carrying at least 50 passengers, or indeed at least 100 or 200 passengers, or freight. At the front of the fuselage 4 it includes a cockpit 12 that is to be occupied by at least one pilot.

The method of the invention enables an arbitrary number n of parts to be assembled so as to be fastened rigidly together, and it allows some number p of the parts to be removed subsequently, while leaving the other n-p parts in place still rigidly fastened together. The description below relates to implementing the method for rigidly assembling together three parts 20, 22, and 24, it being understood that the method can be implemented with a greater number of parts.

The parts may be made of metal, composite material, synthetic material, etc. . . . . . By way of example, the parts are structural parts of any portion of the airplane 2, such as the fuselage, one of the wings, the tail, a jet pylon, etc.

In this example, the three parts are fastened together in a zone where each of them presents a shape that is flat and plane. Nevertheless, each of them could present curvature in a plane or two curvatures in two mutually perpendicular planes.

In a first step of implementing the method, the three parts are placed in the configuration that they are to occupy once assembly is complete. For this purpose, the three parts are stacked one against another with their thicknesses being superposed. The parts present main faces that are plane and parallel to one another, with the main faces of contiguous parts being in mutual area contact. Thus, the intermediate part 22 in the stack is sandwiched between the parts 20 and 24 and is in contact via its main faces respectively with a main face of each of the other two parts.

In a following step, orifices are drilled in the three parts having this configuration. The three orifices 30, 32, and 34 in the respective parts 20, 22, and 24 share a common axis 36 that is normal to the main faces of the parts. The orifices present circular symmetry about the axis 36.

Specifically, they are configured as follows.

The orifice 30 in the bottom part 20 presents a single cylindrical face.

The orifice 32 in the intermediate part 22 presents a bottom cylindrical portion following the orifice 30 and having the same diameter, and a top frustoconical portion following the cylindrical portion, having its smallest diameter equal to the diameter of the cylindrical portion, and flaring towards the top part 24.

The top part presents an orifice 34 presenting a cylindrical bottom portion following on from the frustoconical portion of the intermediate part and having the same diameter as the greatest diameter of the frustoconical portion. It also presents a frustoconical top portion having its smallest diameter equal to the diameter of the cylindrical portion and flaring therefrom.

The orifices thus become larger when going upwards from the bottom in the stack, in this example.

Figure 7:
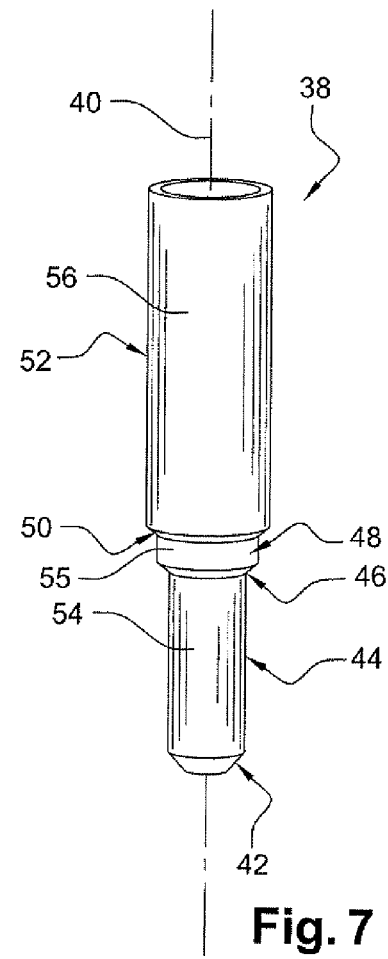
FIG. 7 is a perspective view of a drill bit used during implementation of the method.

The drilling is performed in a single operation for the entire stack of these parts. This is done using a drill having a bit as shown in FIG. 7. The bit 38 is in the form of a body of revolution about its axis 40. It presents a frustoconical tip 42 followed continuously in an upward direction from the bottom by:

a cylindrical face 44;
a frustoconical face 46 having its smallest diameter equal to the diameter of the cylindrical face and flaring away therefrom;
a cylindrical face 48 having a diameter equal to the largest diameter of the face 46;
a frustoconical face 50 having its smallest diameter equal to the diameter of the cylindrical face 48 and flaring away therefrom; and finally
a cylindrical face 52 of diameter equal to the largest diameter of the frustoconical face 50.

These faces are contiguous one after another in that order.

The bit comprises a shank 54 carrying the tip 42 and the face 44, an intermediate sleeve 55 carrying the faces 46 and 48, and a sleeve 56 carrying the faces 50 and 52. The sleeves 55 and 56 constitute parts that are distinct from the shank 54, relative to which each of them is movably mounted in sliding independently of one another along the axis 40 so as to have positions that are adjustable along the shank. This adjustment is performed in order to take account of the thicknesses of the parts 22 and 24.

For drilling, the tip 42 of the bit is inserted into the stack from the top main face of the top part 24 and the bit is caused to pass through all of the parts until it projects from under the bottom face of the bottom part 20. The face 44 makes the orifice 30 and the bottom portion of the orifice 32, the frustoconical face 46 makes the frustoconical portion thereof, the face 48 makes the cylindrical portion of the orifice 34, and the frustoconical face 50 makes the frustoconical portion thereof. Once the hole has been drilled, the bit is removed by being extracted through the top part 24. All of the orifices are thus made in a single pass of the tool.

Figure 4:
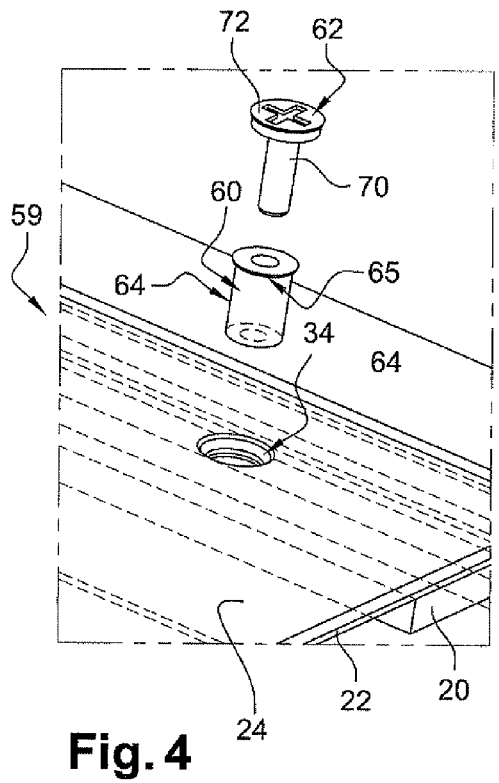
FIGS. 4 and 5 are perspective views showing steps of implementing the method on the same parts.
Figure 5:
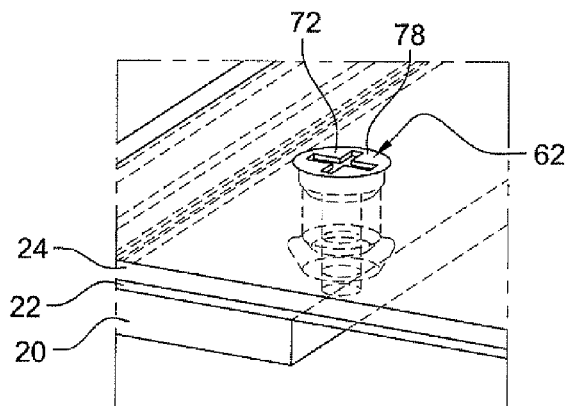

Use is then made of a fastener member 59 shown in particular in FIG. 4 and comprising a crimping element 60 such as a nut, and a screw 62, both made of metal.

The element 60 is generally in the form of a body of revolution about its axis. It is manufactured and delivered with an outside face 64 that presents a cylindrical shape over the major fraction of its height from the bottom end of the element. It is terminated by a frustoconical segment 65 at the top end of the element, contiguous with the cylindrical face, and having a smallest diameter that is equal to the diameter of the cylindrical face, the segment flaring towards the top end. The outside face 64 has a diameter corresponding to the diameter of the orifice 30 so as to implement a male-female assembly with the orifices 30 and 32.

The element 60 presents an axial orifice passing through the entire height of the element. It is subdivided internally into three zones. In a bottom zone, it presents a helical thread. In a top zone of the element, the orifice 66 has the same diameter as the greatest diameter of the orifice in the bottom zone, but it does not have a thread, such that it is smooth. In an intermediate zone of the element, the orifice 66 presents a diameter that is greater than the greatest diameter of the orifice in the bottom zone, such that its wall presents in this location a thinner portion 68, which means that this zone is a zone of weakness. This zone is continuous in a circumferential direction around the axis of the element.

The screw 62 comprises a shank 70 and a head 72.

Figure 3:
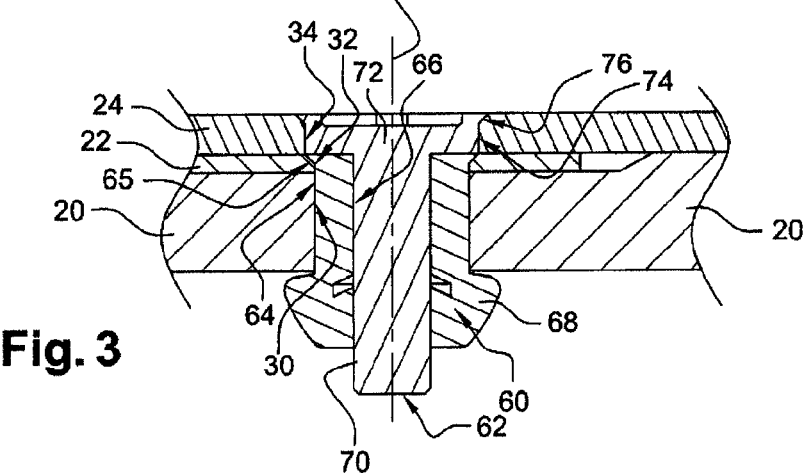

As shown in FIG. 3, the shank presents a cylindrical face that is threaded along a segment of its length starting from its free end in order to enable it to make a helical connection with the orifice 66 of the element 60.

The head 72 of the screw presents a shape and dimensions that enable a male-female assembly to be implemented with the top part 24. It presents a top face 78 that is milled, and thus plane. Nevertheless, this head need not be milled and it could be rounded. The head presents a cavity or socket, e.g. of cruciform shape in order to enable the screw to be driven by a screwdriver.

The member 59 is transported, stored, and then delivered to the assembly line where the parts 20, 22, and 24 are assembled in a configuration in which the screw 62 has its thread engaged in the thread of the element 60 in which it penetrates, while nevertheless not being tightened.

The member presenting this configuration is inserted into the orifices in the stack, entering from the top face of the top part 24 and continuing until the element 60 projects below the bottom part 20. The member is pushed in until the element 60 comes into axial abutment via its frustoconical face against the intermediate part 22.

Figure 2:
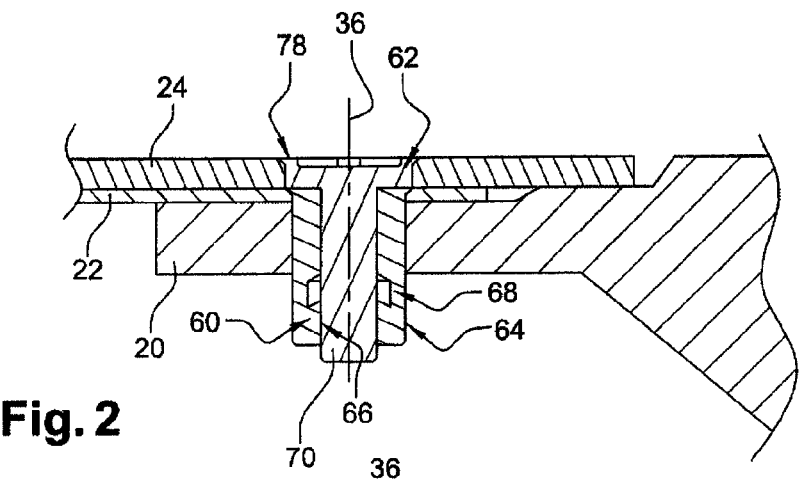
FIGS. 2 and 3 are two axial section views of an assembly in the FIG. 1 airplane showing two different steps in the implementation of the method.

Thereafter, a screwdriver is used to drive the screw 62 further into the element, and consequently downwards in FIG. 2, until it comes into axial abutment against the element and against the top part 24. This is the configuration shown in FIG. 2. The screw is then in a position that is flush relative to the top part 24, the face 78 lying in the plane of the top face of the part 24.

The screw continues to be driven into the element. Since the screw engages solely with the bottom portion of the element 60, continued driving deforms the weak zone 68 of the wall and causes the bottom portion to slide towards the head of the screw, as shown in FIG. 3. This enlarges the thin-walled zone and crimps the element 60 against the two parts 22 and 24. These parts are stressed by the element 60 in opposite axial directions, i.e. upwards by the now-deformed wall zone 68 and downwards by the frustoconical portion 65. Screw fastening also secures the top part 24 to the other two parts since the top part is urged axially towards the other two by the frustoconical portion 76 of the head of the screw. Thus, the parts 20 and 22 are clamped one against the other and the part 24 is screw-fastened to the two preceding parts. In a single operation, these three parts are rigidly fastened together.

Once assembly has been completed, the screw remains in a position that is flush relative to the top part 24 and thus continues to bear directly against the element 60 with which it is in contact.

Naturally, it is preferable for such assemblies made using a member 59 to be provided at a plurality of locations over the stack of three parts, whenever possible.

Figure 6:
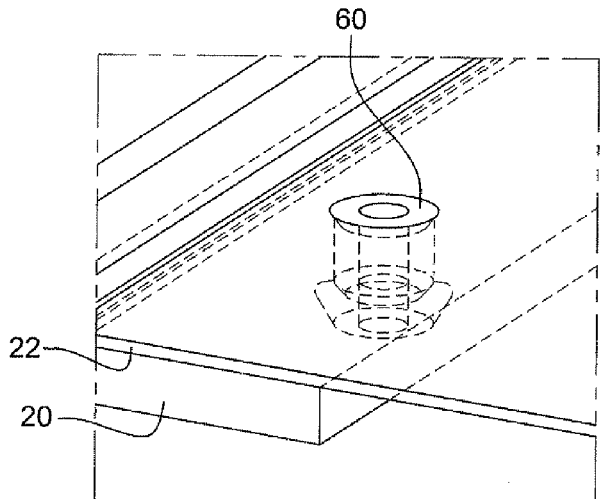
FIG. 6 is a view analogous to FIG. 5 showing the assembly after removal of the upper part.

If it is desired to separate the top part 24 from the other two, then the screw 70 is unscrewed, such that it becomes progressively extracted from the element 60 which remains in its deformed configuration. The two parts 20 and 22 remain rigidly fastened to each other by this element, while the part 24, once the screw has been fully unscrewed, is removed so as to be separated from the other two. This leads to the configuration of FIG. 6 which shows that the two parts 20 and 22 are still rigidly fastened to each other while the part 24 has been removed. The element 60 is flush against the top face of the intermediate part 22.

The method of the invention is particularly adapted to blind mounting. As described above, there is no need to access the assembly from beside the bottom face of the bottom part 20 other than through the drilled orifices.

Making all of the orifices in a single operation is made possible by the fact that the orifices are of diameters that decrease from top to bottom.

This method is suitable for making an assembly of moderate weight since it uses only a single fastener member 59 for fastening all of the parts together. It is implemented with a small number of steps and can therefore be performed quickly.

The invention may be implemented by using the crimped element 60 to fasten together some number of parts that is equal to or greater than three. Furthermore, and optionally together therewith, it is possible to fasten to the two parts that are held together by crimping some number of parts that is equal to or greater than two.

It is possible to implement the method by performing the crimping and screw-fastening steps separately. Thus, for example, it is possible to perform the crimping by means of one tool and only subsequently to insert into the element 60 the screw 72 that is used for screw-fastening the other parts. Nevertheless, performing both of the above-described operations simultaneously is faster.

Naturally, numerous modifications may be made to the invention without going beyond the ambit thereof.

What is claimed is:

1. A method of fastening aircraft parts together, the method comprising the steps of:
   crimping an element onto at least two parts so as to fasten them together; and
   screwing a screw into the element through at least one other part so as to fasten all the parts together and so as to place a head of the screw in a flush position relative to the other part,
   wherein the at least one other part is capable of being unfastened while the at least two parts remain fastened, and
   wherein the head of the screw is put into contact with the element, the head of the screw being coplanar with the at least one other part.

2. A method according to the preceding claim, wherein orifices for receiving the element and the screw are made by means of a single operation for all of the parts.

3. A method according to claim 1, wherein the element is inserted into the parts before crimping.

4. A method according to claim 1, wherein the element carrying the screw is inserted into the parts.

5. A method according to claim 1, wherein the screw is driven so as to perform the crimping under the effect of the screw-driving.

6. A method according to claim 1, wherein a crimped portion of the element extends outside the at least two parts.

7. A method according to claim 1, wherein the at least two parts are stressed by the element in opposite axial directions.

* * * * *